Sept. 17, 1935. M. L. RATHBUN 2,014,951
CASE OR BOX
Filed July 26, 1934
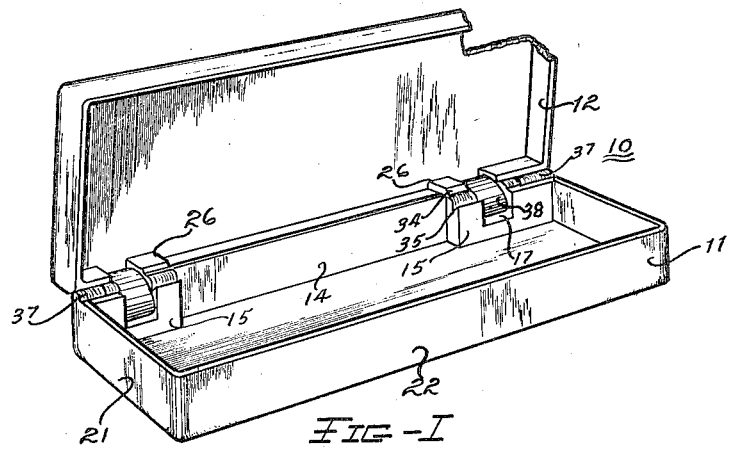
Fig-1
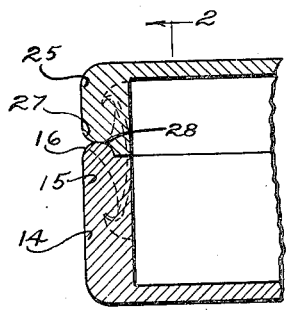
Fig-3
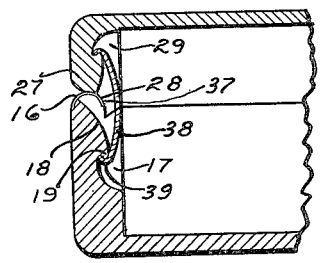
Fig-4
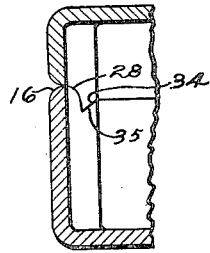
Fig-5
Fig-6
Fig-7
Fig-2
INVENTOR
Merrill L. Rathbun
BY Richmond S. Hayes
His ATTORNEY Patented Sept. 17, 1935

2,014,951

UNITED STATES PATENT OFFICE 2,014,951

CASE OR BOX

Merrill L. Rathbun, Jamestown, N. Y.

Application July 26, 1934, Serial No. 737,061

14 Claims. (Cl. 217—57)

This invention relates to an improvement in cases or boxes and particularly to a closed case and means for attaching the closure to the body of the case.

The invention is particularly directed to improvements on my Patent #1,833,305, which discloses a case having a receptacle body portion and cover, these complementary elements being retained in pivotal or hinge-like engagement with each other through use of one or more strap springs. Adapting this case for varied uses and its production in many sizes, has brought about certain improvements and changes in structure which are the subject of the present invention. These improvements include the provision of a stronger case, better bearing surfaces, means for limiting opening of the cover and other advantages. The material from which the case is formed has no bearing on the invention inasmuch as all moldable substances such as rubber, bakelite, and synthetic resins may be used as well as wood or metal.

One of the objects of the invention lies in the provision of complemental spring supporting means in the body portion and cover which, when the case is opened, form a seat with which the spring contacts for the purpose of constituting a stop to limit the degree of opening of the cover.

Another object of the invention lies in the provision of interfitting projections and depressions made in the body portion and cover which, when the cover is closed, prevent twisting or weaving of the elements of the case.

A further object of the invention lies in the provision of a rolled edge on the rear outside wall of the cover to permit cooperation of the spring with its supporting means in the body portion and cover to limit the degree of opening of the cover.

Another and further object of the invention lies in the provision of a bead or raised portion provided at one or more points on the interfitting pivotal surfaces of the body portion and cover for the purpose of constituting the actual contacting surface between these elements.

Another and still further object of the invention lies in the provision of a case having two or more pairs of interfitting rolled surfaces for the purpose of reducing the amount of material necessary to produce certain types of cases as well as to prevent binding of the body portion and cover due to warpage or other causes.

A still further object of the invention lies in the provision of reinforced portions at the point or points where it is desired to mount a spring.

Other and further objects of the invention will be more fully understood from a consideration of the following specification which is taken in conjunction with the accompanying drawing and in which, Figure 1 is a perspective view of one modification of the invention showing the cover in open position;

Figure 2 is a fragmentary sectional view taken substantially on the line 2—2 of Figure 3 and shows in elevation a spring engaged with the body portion and cover;

Figure 3 is a vertical transverse sectional view showing the reinforcement of the case for the spring connection;

Figure 4 is a vertical transverse sectional view taken on the line 4—4 of Figure 2 showing the case held in closed position by means of the spring;

Figure 5 is a vertical transverse sectional view taken substantially on the line 5—5 of Figure 2 at a point between the reinforced portions of the case, and shows further interfitting parts of the reinforcing portions by which to prevent twisting or weaving of the elements of the case;

Figure 6 is a fragmentary vertical sectional view of the case showing the spring serving as a stop to limit opening of the cover; and, Figure 7 is a view similar to Figure 6 with the spring removed showing the complementary curved portions of the body portion and cover which together serve as a seat for the spring.

Referring to the drawing the invention, generally indicated by the reference numeral 10, is comprised of a receptacle body portion 11 and cover 12. The body portion 11 is provided with a rear wall 14 having one or more reinforced portions 15, along the upper edge of which is formed a rolled portion or bead 16. This bead is interrupted, midway of its length, by a recess or slot 17 which continues downwardly of the reinforced portion 15. The base wall 18 of the recess is formed in a predetermined curve and terminates in a shoulder 19. The side of front walls 21 and 22 of the body portion are optionally formed with or without projecting edges or recesses with which to engage the cover 12 for the purpose of providing an overlap or seal when the cover is closed down upon the body portion.

The rear wall 25 of the cover 12 is provided with one or more reinforced portions 26, these portions being aligned with the reinforced portions 15 of the body portion 11. The portion 26 terminates along its lower edge in a rolled portion 27. This rolled portion continues downwardly through a reverse curve to form a seat 28 for the bead 16 of the body portion. The portion 26 is also interrupted midway of its length by a recess or slot 29, this recess corresponding in position to the recess 17 and having a curved base wall 30 which terminates in a shoulder 31.

Adjacent the recess 29 the portion 26 is formed with downwardly directed ribs or lugs 33 which are shown to extend beneath the bottom edge of the rear wall and terminate in pointed or wedge-like projections 34. The number or ribs and the particular contour thereof or of the projections 34 is largely dependent on the type, size, and material from which the receptacle is made. The reinforced portion 15 of the body portion 11 is correspondingly provided with upwardly opening recesses 35 of a shape to snugly receive the projections 34 of the cover. When the cover is closed upon the body portion, the interfitting of the projections 34 into recesses 35 prevents twisting or misalignment of the cover with respect to the body portion.

It is contemplated that the present invention will be applied to containers or receptacles of considerable proportion and it has been found that a bearing surface the full length of the reinforced portions 15 and 26 is unnecessary. It is therefore contemplated to provide a slightly raised portion 37 on each of the beads 16 for the purpose of reducing the frictional contact with the portion 27 and seat 28.

A spring clip 38 having claw ends 39 serves to maintain the body portion 11 and cover 12 in pivotal engagement, causing the raised portions 37 to at all times engage the portion 27 and seat 28. In a structure of this class it is difficult to utilize any ordinary means for limiting the opening of the cover. It is the usual practice to provide a shoulder on the rear edge of the cover which, when said cover is opened, strikes and rests against the outer face of the rear wall of the body portion. Since the cover of the present disclosure is secured to the body portion by a spring clip, and the clip is so arranged as to have a dead center only in partially open position thus exerting full pressure at fully opened or closed position, it has been found preferable and advantageous, regardless of the material from which the receptacle is made, to utilize the clip and the reinforced portions of the body portion and cover as a stop to limit opening of the cover. Referring particularly to Figures 6 and 7, it will be noted that the base walls 18 and 30 of the body portion and cover respectively are formed through curves which, when said elements are in open complementary position, together form a continuous curve substantially that of the curvature of the clip. Thus contact of the clip throughout its length with the curved walls 18 and 30 prevents further opening of the cover although with the clip removed, it will be noted that the cover could be rotated to a more open position by reason of the rolled portion 27.

In practically all of the materials from which a case of this type may be produced, with the exception of metal, there is a slight uncontrollable tendency toward warpage, this being particularly true in molded cases. In order that the existence of any slight warpage may not interfere with the pivotal movement of the cover with respect to the body portion of the case, the bead 16 of the body portion is comparatively short with respect to the length of the box, being formed, as shown in the present modification, in two parts, one adjacent each end of the case. The rear wall 14 of the body portion and the rear wall 25 of the cover between the reinforced portions may be and is, in molded cases for the sake of economy, much thinner than the reinforced portions (see Figure 5). Since there is no interfitting of the central portions of the rear walls of the body portion and cover, any slight warpage or irregularity in these walls has no effect on the successful manipulation of the cover.

Although applicant has shown and described only one modification of a means for providing a combined hinge and spring structure for use in connection with all types of small cases, it will be understood that the invention may be successfully applied to many different kinds of cases by simple revision or alteration of the parts employed in the invention and such alteration or modification is therefore contemplated in so far as it may lie within the spirit and scope of the invention as defined in the hereunto annexed claims.

Having thus set forth my invention what I claim as new and for which I desire protection by Letters Patent is:—

1. A receptacle comprising a body portion and cover, complementary pivotal means formed integral with said body portion and said cover, spring means securing said means in operable pivotal relationship, and means forming a part of said receptacle cooperating with said spring means to limit opening of said cover.

2. A receptacle body portion and cover, complementary pivotal means in said body portion and said cover, spring means securing said complementary means in operable pivotal relationship, and further complementary means in said body portion and cover cooperating with said spring means to limit opening of said cover.

3. A receptacle body portion and cover, complementary pivotal means in said body portion and said cover, spring means securing said complementary means in operable pivotal relationship, complementary curved walls in said body portion and said cover, said walls, when said cover is opened, together forming a surface with which said spring means is engaged whereby to limit opening of said cover.

4. A receptacle body portion and cover, complementary pivotal means in said body portion and said cover, spring means securing said complementary means in operable pivotal relationship, complementary curved walls in said body portion and said cover, said walls, in a predetermined opened position of said cover, producing a continuous curved surface conforming to the contour of said spring means and with which said spring means is fully engaged whereby to limit opening of said cover.

5. In a receptacle body portion and cover, complementary pivotal means in said body portion and said cover, spring means securing said complementary means in operable pivotal relationship, means in said body portion, further means in said cover, said means and said further means, when said cover is closed upon said body portion, cooperating to secure said body portion and said cover against relative lateral twisting or displacement.

6. A receptacle body portion and cover, complementary pivotal means in said body portion and said cover, spring means securing said complementary means in operable pivotal relationship, further means in said body portion and said cover, said further means being operable, when said cover is closed on said body portion, to secure said body portion and said cover against relative lateral displacement.

7. A receptacle body portion and cover, complementary pivotal means in said body portion and said cover, spring means securing said complementary means in operable pivotal relationship, projections and depressions in said body portion and said cover, said projections and said depressions being interengaged, when said cover is closed on said body portion, to secure said body portion and said cover against relative lateral twisting or displacement.

8. In a receptacle body portion and cover, correlated reinforced wall portions in the body and cover, means in the reinforced portion of the body, further means in the reinforced portion of the cover, said means and said further means, when the cover is closed upon the body, cooperating to secure the body and cover against relative lateral twisting or displacement.

9. In a receptacle body portion and cover, correlated reinforced wall portions in the pivotal side of the body and cover, walls forming a depression in the reinforced portion of the body, a projection on the reinforced portion of the cover, said depression and said projection, when the cover is closed upon the body, interfitting and serving to secure the body and cover against lateral twisting or displacement.

10. In a receptacle body portion and cover, the rear wall of the cover and the rear wall of the body portion being formed with complementary portions enabling the cover to have pivotal movement relative to the body, means on one of the complementary portions for reducing the extent of surface contact between the complementary portions, and spring means engaged with the rear walls of the body and cover, said spring means serving to retain the body and cover in engagement with each other in all positions which the cover may assume.

11. In a receptacle body portion and cover, the rear wall of the cover and the rear wall of the body portion being formed with complementary portions enabling the cover to have pivotal movement relative to the body, a raised portion on one of the complementary portions, said raised portion serving to reduce the surface contact between the complementary portions, and springs means engaged with the rear walls of the body and of the cover, said means serving to retain the body and cover in pivotal engagement with each other in all positions which the cover may assume.

12. A receptacle body portion and cover, the rear wall of the body and of the cover being formed with two or more spaced apart complementary engaged portions enabling the cover to have pivotal movement relative to the body, the rear wall of the body and of the cover intermediate the complementary engaged portions being unconnected and having abutment only when the cover is closed upon the body, and spring means engaged with the rear wall of the body and of the cover, said means retaining the body and cover in pivotal engagement with each other in all positions which the cover may assume.

13. A receptacle body portion and cover, the rear wall of the body and of the cover being each formed with two or more spaced apart reinforced portions, complementary engaged portions in adjacent reinforced portions of the body and cover, said complementary portions enabling the cover to have pivotal movement relative to the body, and spring means engaged with the rear wall of the body and of the cover, said means retaining the body and cover in pivotal engagement with each other in all positions which the cover may assume.

14. A receptacle body portion and cover, the rear wall of the body and of the cover being each formed with two or more spaced apart reinforced portions, complementary pivotal portions in adjacent reinforced portions of the body and cover, said complementary portions enabling the cover to have pivotal movement relative to the body, the rear wall of the body and of the cover intermediate the pivotal portions being unconnected and having abutment only when the cover is closed upon the body, and spring means engaged with the body and cover, said means retaining the body and cover in pivotal engagement with each other in all positions which the cover may assume.

MERRILL L. RATHBUN.